United States Patent
Zheng et al.

(10) Patent No.: US 12,161,970 B1
(45) Date of Patent: Dec. 10, 2024

(54) $CO_2$ DESORPTION SYSTEM SUITABLE FOR LIMITED SPACE IN COMPLEX SAILING REGION AND FLEXIBLE CONTROL METHOD

(71) Applicants: Jiaxing Research Institute, Zhejiang University, Jiaxing (CN); Zhejiang University, Hangzhou (CN)

(72) Inventors: Chenghang Zheng, Jiaxing (CN); Xiang Gao, Jiaxing (CN); Can Zhou, Jiaxing (CN); Yongxin Zhang, Jiaxing (CN); Qihao Chen, Jiaxing (CN); Weihong Wu, Jiaxing (CN); Zhiying Zhou, Jiaxing (CN); Haitao Shen, Jiaxing (CN); Haidong Fan, Jiaxing (CN); Qingyi Li, Jiaxing (CN); Yifan Wang, Jiaxing (CN); Peng Liu, Jiaxing (CN); Libin Yu, Jiaxing (CN); Tao Wang, Jiaxing (CN)

(73) Assignees: Jiaxing Research Institute, Zhejiang University, Jiaxing (CN); Zhejiang University, Hangzhou (CN)

( * ) Notice: Subject to any disclaimer, the term of this patent is extended or adjusted under 35 U.S.C. 154(b) by 0 days.

(21) Appl. No.: 18/799,964

(22) Filed: Aug. 9, 2024

(51) Int. Cl.
*B01D 53/92* (2006.01)
*B01D 53/14* (2006.01)
(Continued)

(52) U.S. Cl.
CPC ......... *B01D 53/92* (2013.01); *B01D 53/1418* (2013.01); *B01D 53/1425* (2013.01);
(Continued)

(58) Field of Classification Search
CPC ................ B01D 53/92; B01D 53/1418; B01D 53/1425; B01D 53/1475; B01D 53/343;
(Continued)

(56) References Cited

U.S. PATENT DOCUMENTS

| | | | |
|---|---|---|---|
| 9,562,107 B2 | 2/2017 | Walker et al. | |
| 10,207,269 B2 | 2/2019 | Ismagilov et al. | |
| 11,324,815 B2 | 5/2022 | Malouin et al. | |

FOREIGN PATENT DOCUMENTS

CN 115463521 A * 12/2022

OTHER PUBLICATIONS

CN-115463521-A English translation (Year: 2022).*

* cited by examiner

*Primary Examiner* — Anita Nassiri-Motlagh (57) ABSTRACT

A $CO_2$ desorption system suitable for limited space in a complex sailing region comprises an exhaust boiler, a compact $CO_2$ absorber, a compact $CO_2$ lean-rich liquid heat exchanger, a compact $CO_2$ desorber, a compact $CO_2$ rich liquid preheating device, a compact $CO_2$ rich liquid reboiling pre-desorption device and an intelligent control platform. Further, a global optimization control method for the $CO_2$ desorption system suitable for limited space in a complex sailing region is further established based through a knowledge and data-driven exhaust extraction flow accurate-prediction model for a heat source of a $CO_2$ rich liquid preheating device and a steam extraction flow accurate-prediction model for a heat source on an upper section of a $CO_2$ rich liquid reboiling pre-desorption device to realize flexible control of operation parameters of the desorption system under different operating conditions of an engine.

8 Claims, 7 Drawing Sheets

(51) Int. Cl.
 *B01D 53/34* (2006.01)
 *B01D 53/62* (2006.01)
(52) U.S. Cl.
 CPC ....... *B01D 53/1475* (2013.01); *B01D 53/343* (2013.01); *B01D 53/62* (2013.01); *B01D 2252/10* (2013.01); *B01D 2252/204* (2013.01); *B01D 2252/50* (2013.01); *B01D 2257/504* (2013.01); *B01D 2258/01* (2013.01)
(58) Field of Classification Search
 CPC ................ B01D 53/62; B01D 2252/10; B01D 2252/204; B01D 2252/50; B01D 2257/504; B01D 2258/01
 USPC ......................................................... 423/228
 See application file for complete search history.

CO$_2$ DESORPTION SYSTEM SUITABLE FOR LIMITED SPACE IN COMPLEX SAILING REGION AND FLEXIBLE CONTROL METHOD

CROSS-REFERENCE TO RELATED APPLICATIONS

This application claims priority to Chinese Patent Application No. 202311707344.1 with a filing date of Dec. 13, 2023. The content of the aforementioned application, including any intervening amendments thereto, is incorporated herein by reference.

TECHNICAL FIELD

The disclosure belongs to the technical field of energy and environment, and particularly relates to a CO2 desorption system suitable for limited space in a complex sailing region and a flexible control method.

BACKGROUND OF INVENTION

In recent years, the continuous implementation of ship emission-related control policies and regulations and the introduction of increasingly stricter ship emission standards in China and foreign countries lead to higher requirements for CO2 emission reduction in the ship industry. However, compared with carbon capture on land, carbon capture of ship exhaust faces the problems that the small space of a ship can only receive a few pieces of equipment and a carbon capture system suitable for a complex sailing region cannot operate efficiently and stably and has high energy consumption.

Chinese Patent Application No. CN115463521A provides a low-energy consumption capture device for CO$_2$ in flue gas of coal-fired power plants, which extracts heat from desulfurized slurry by flash evaporation of the desulfurized slurry, that is, heat in flue gas is used actually, thus increasing the heat utilization rate; a lean-rich liquid heat exchanger, a second absorption heat pump and a first absorption heat pump realize a gradient rise of the temperature of rich liquid to obtain a regeneration temperature, such that consumption of steam in the power plants during the MET regeneration process can be effectively reduced, thus reducing energy consumption during the regeneration process. Although this technique can realize efficient utilization of waste heat of flue gas, it cannot solve the problems of poor operating stability and high operating energy consumption of a desorption system caused by frequent fluctuations of the components of ship exhaust, the CO$_2$ concentration of flue gas and the temperature of flue gas.

In view of the above problem, the disclosure provides a CO$_2$ desorption system suitable for limited space in a complex sailing region and a flexible control method, wherein the CO$_2$ desorption system realizes efficient utilization of waste heat of ship exhaust by multiple approaches such as utilization of waste heat of ship exhaust, lean-rich liquid heat-exchange, rich liquid splitting, and CO$_2$ rich liquid reboiling pre-desorption, and the operating parameters of the desorption system can be flexibly controlled by means of the flexible control method for the CO$_2$ desorption system suitable for a complex sailing region, such that stable operation of the desorption system in a complex sailing environment is realized, and desorption energy consumption is further reduced; and a compact desorber, a compact CO$_2$ rich liquid reboiling pre-desorption device, a compact CO$_2$ absorber and a compact CO$_2$ lean-rich liquid heat exchanger are arranged to overcome the difficulty in arrangement of a desorption system in limited space.

BRIEF SUMMARY OF THE INVENTION

In view of the problems in the related art, the disclosure provides a CO$_2$ desorption system suitable for limited space in a complex sailing region and a flexible control method to solve the abovementioned technical problems in the related art.

To solve the abovementioned technical problems, the disclosure is implemented by the following technical solution:

The disclosure provides a CO$_2$ desorption system suitable for limited space in a complex sailing region, comprising an exhaust boiler, a compact CO$_2$ absorber, a compact CO$_2$ lean-rich liquid heat exchanger, a compact CO$_2$ desorber, a compact CO$_2$ rich liquid preheating device, a compact CO$_2$ rich liquid reboiling pre-desorption device and an intelligent control platform.

Ship exhaust passes through the exhaust boiler to realize waste heat utilization and then enters a ship exhaust scrubber to be purified; the purified ship exhaust further enters the compact CO$_2$ absorber, CO$_2$ in the ship exhaust is captured with a composite amine/mixed salt absorbent, the absorbent then turns into CO$_2$ rich liquid, and 10%-20% of the CO$_2$ rich liquid is split out to directly flow to a CO$_2$ desorber top; remaining non-split CO$_2$ rich liquid is delivered by a rich liquid delivery pump a into the CO$_2$ lean-rich liquid heat exchanger to be heated by heat exchange for the first time; after being heated by heat exchange for the first time, the rich liquid is delivered by a rich liquid delivery pump b into Z-shaped bushings of the CO$_2$ rich liquid preheating device and then comes in contact with an evaporation section of the CO$_2$ rich liquid preheating device to be heated by heat exchange for the second time, and then the rich liquid enters an upper portion of the CO$_2$ desorber; all the rich liquid flows through a liquid distributor and packing layers of the CO$_2$ desorber to reach a CO$_2$ desorber bottom and then circulates to the CO$_2$ rich liquid reboiling pre-desorption device to be heated by heat exchange for the third time to reach a rich liquid adsorption temperature; semi-rich liquid obtained after the third time of heating is subjected to liquid water vaporization and releases vaporized substances containing a proportion of CO$_2$, the vaporized substances penetrate through the packing layers by means of a riser in the CO$_2$ desorber to realize desorption of high-temperature CO$_2$, the high-temperature CO$_2$ enters the upper portion of the CO$_2$ desorber to reversely come in contact with the rich liquid that is heated for the second time to enhance further desorption of the rich liquid, and the semi-rich liquid that is not vaporized after being heated by heat exchange for the third time and the rich liquid obtained after desorption turn into lean liquid.

Preferably, the compact CO$_2$ desorber comprises a demister, a CO$_2$ split rich liquid distributor, a packing layer, a rich liquid distributor after secondary heating, a packing layer, a riser and a desorber bottom which are sequentially arranged from top to bottom, and the compact CO$_2$ rich liquid reboiling pre-desorption device is connected to the desorber bottom.

Preferably, a superficial gas velocity of the CO$_2$ desorber is 0.5-0.8 m/s, packing is one or more selected from MELLAPAK, FLEXIPAC and PALL, a structural parameter of the packing is one or more selected from 500Y, 500X, 250X and 250Y, the number of the packing layers is 2-3, and a total height of the packing layers is 4-8 m.

Preferably, the $CO_2$ rich liquid preheating device comprises an evaporation section and a condensation section, two-phase closed heat-exchange tubes are arranged in the $CO_2$ rich liquid preheating device, upper portions of the two-phase closed heat-exchange tubes are sleeved with Z-shaped bushings, the evaporation section and the condensation section of the $CO_2$ rich liquid preheating device are isolated by a partition and located on the upper portions and lower portions of the two-phase closed heat-exchange tubes respectively, a heat-exchange medium in the lower portions of the two-phase closed heat-exchange tubes is heated by a high-temperature heat source, the medium is heated to be evaporated to the upper portions of the two-phase closed heat-exchange tubes to further make full contact with the rich liquid, that is heated by heat exchange for the first time, in the upper portions of the two-phase closed heat-exchange tubes to realize a temperature rise of the rich liquid.

Preferably, a heat source of the $CO_2$ rich liquid preheating device is high-temperature exhaust from an outlet of a ship engine, ship exhaust with waste heat being used by the exhaust boiler, steam of the waste boiler, or ship exhaust in front of the scrubber.

Preferably, the two-phase closed heat-exchange tubes are configured as trapezoidal spiral structures, the lower portions of the two-phase closed heat-exchange tubes have a diameter of 16-32 mm, the upper portions of the two-phase closed heat-exchange tubes have a diameter of 20-40 mm, upper portions of the two-phase closed heat-exchange tubes account for ⅓ of a bulk length of the two-phase closed heat-exchange tubes, and an installation angle of the two-phase closed heat-exchange tubes is 10°-30°.

Preferably, the heat-exchange medium in the two-phase closed heat-exchange tubes is 1-(methoxy) nonafluorobutane or perfluoropentane, and a filling rate of the medium in the two-phase closed heat-exchange tubes is 20%-40%.

Preferably, the $CO_2$ rich liquid reboiling pre-desorption device comprises a rich liquid uniform-distribution section, a heat-exchange section and a pre-desorption section; a liquid distributor is arranged in the rich liquid uniform-distribution section, the heat-exchange section is a main part of the $CO_2$ rich liquid reboiling pre-desorption device, the pre-desorption section is a detachable pipe provided with a flat cover, and the pipe has a gas outlet located in an upper end of the pipe and a liquid outlet located in a lower end of the pipe and is able to realize gas-liquid separation of secondary steam and hot lean liquid.

Preferably, a heat source of the $CO_2$ rich liquid reboiling pre-desorption device is high-temperature exhaust from an outlet of a ship engine, ship exhaust with waste heat being used by the exhaust boiler, steam of the waste boiler, or ship exhaust in front of the scrubber.

Preferably, the liquid distributor arranged in the rich liquid uniform-distribution section is a plug-in liquid distributor or a sawtooth overflow distributor.

Preferably, a shell of the heat-exchange section of the $CO_2$ rich liquid reboiling pre-desorption device is cylindrical and has an upper end and a lower end, the upper end uses steam of the exhaust boiler as a heat source, the temperature of the steam is 125-155° C., the lower end uses the high-temperature exhaust from the outlet of the ship engine, the ship exhaust with waste heat being used by the exhaust boiler, the steam of the waste boiler, or the ship exhaust in front of the scrubber as a heat source, and the flow of the exhaust is flexibly controlled by means of the intelligent control platform according to an actual condition.

Preferably, falling-film pipes are vertically arranged in the heat-exchange section of the $CO_2$ rich liquid reboiling pre-desorption device, outer walls of the falling-film pipes are configured as streamlined spiral unthreaded pipes, inner walls of the falling-film pipes are configured as smooth straight pipes, the falling-film pipes have a length of 3000 mm, 4000 mm or 6000 mm, a diameter of 28-32 mm and a wall thickness of 2-3 mm, and a center distance between the falling-film pipes is more than twice the diameter of the falling-film pipes.

Monitoring control devices are arranged at an inlet in a front end of the heat-change section, a steam inlet and an exhaust inlet of the $CO_2$ rich liquid reboiling pre-desorption device to monitor in real time the temperature and flow of rich liquid, the temperature and flow of steam, and the temperature and flow of exhaust.

The disclosure relates to a flexible control method for a $CO_2$ desorption system suitable for limited space in a complex sailing region, comprising: establishing a knowledge and data-driven exhaust extraction flow accurate-prediction model for a heat source of a $CO_2$ rich liquid preheating device and a steam extraction flow accurate-prediction model for a heat source on an upper section of a $CO_2$ rich liquid reboiling pre-desorption device, establishing a global optimization control method for a $CO_2$ desorption system suitable for limited space in a complex sailing region, and performing operation optimization with an outlet rich liquid temperature of the $CO_2$ rich liquid reboiling pre-desorption device and energy consumption of the desorption system as constraint indicators; when a ship sails to different regions or an operating condition of the ship fluctuates, implementing accurate prediction of an exhaust extraction flow of the heat source of the $CO_2$ rich liquid preheating device under different operating conditions by means of the knowledge and data-driven exhaust extraction flow accurate-prediction model for the heat source of the $CO_2$ rich liquid preheating device; and, implementing accurate prediction of a steam extraction flow of the heat source of the upper portion of the $CO_2$ rich liquid reboiling pre-desorption device under different operating conditions by means of the steam extraction flow accurate-prediction model for the heat source on the upper section of the $CO_2$ rich liquid reboiling pre-desorption device in conjunction with operating parameters of the desorption system and quality parameters of extracted steam, so as to minimize the steam extraction flow of the heat source on the upper section of the $CO_2$ rich liquid reboiling pre-desorption device under the precondition that the outlet rich liquid temperature of the $CO_2$ rich liquid reboiling pre-desorption device satisfy requirements of the desorption system, thus minimizing energy consumption of the desorption system.

Establishing a knowledge and data-driven exhaust extraction flow accurate-prediction model for a heat source of a $CO_2$ rich liquid preheating device and a steam extraction flow accurate-prediction model for a heat source on an upper section of a $CO_2$ rich liquid reboiling pre-desorption device comprises the following steps:

S1, based on online and historical operation data, establishing a parameter database including physical property parameters of an absorbent, design parameters of a $CO_2$ lean-rich liquid heat exchanger, the $CO_2$ rich liquid preheating device and the $CO_2$ rich liquid reboiling pre-desorption device, inlet and outlet rich liquid temperatures and flows of the $CO_2$ lean-rich liquid heat exchanger, inlet and outlet rich liquid temperatures and flows of the $CO_2$ rich liquid preheating device, inlet and outlet rich liquid temperatures and flows of the $CO_2$ rich liquid reboiling pre-desorption device, inlet and outlet steam temperatures and flows of the $CO_2$ rich liquid reboiling pre-desorption device, inlet and outlet exhaust temperatures and flows of the $CO_2$ rich liquid preheating device, and inlet and outlet exhaust temperatures and flows of the $CO_2$ rich liquid reboiling pre-desorption device;

S2, based on the parameter database established in S1, for the $CO_2$ rich liquid preheating device, analyzing response relations of the inlet rich liquid temperature of the $CO_2$ rich liquid preheating device (the outlet rich liquid temperature of the $CO_2$ lean-rich liquid heat exchanger), an inlet rich liquid $CO_2$ load of the $CO_2$ rich liquid preheating device (an outlet rich liquid $CO_2$ load of the $CO_2$ lean-rich liquid heat exchanger), a lean-rich liquid split fraction, the outlet rich liquid temperature of the $CO_2$ rich liquid preheating device and an exhaust temperature of the heat source of the $CO_2$ rich liquid preheating device with an exhaust flow of the heat source of the $CO_2$ rich liquid preheating device according to a heat-exchange mechanism between different heat sources in the $CO_2$ rich liquid preheating device and outlet rich liquid of the $CO_2$ lean-rich liquid heat exchanger and experiential operation knowledge, establishing an exhaust extraction flow model for the heat source of the $CO_2$ rich liquid preheating device in different sailing regions and operating conditions, modifying the exhaust extraction flow model for the heat source of the $CO_2$ rich liquid preheating device in conjunction with quality parameters of the heat source and historical data of the outlet rich liquid temperature of the $CO_2$ rich liquid preheating device, and establishing the knowledge and data-driven exhaust extraction flow accurate-prediction model for the heat source of the $CO_2$ rich liquid preheating device; and S3, based on the parameter database established in S1, for the $CO_2$ rich liquid reboiling pre-desorption device, analyzing response relations of the outlet rich liquid temperature of the $CO_2$ rich liquid reboiling pre-desorption device, the outlet rich liquid flow of the $CO_2$ rich liquid preheating device, the inlet rich liquid flow of the $CO_2$ rich liquid reboiling pre-desorption device, the inlet rich liquid temperature of the $CO_2$ rich liquid reboiling pre-desorption device, the inlet rich liquid $CO_2$ load of the $CO_2$ rich liquid reboiling pre-desorption device, a steam temperature of the heat source on the upper section of the $CO_2$ rich liquid reboiling pre-desorption device, and a ship exhaust flow and temperature of a heat source on a lower section of the $CO_2$ rich liquid reboiling pre-desorption device with a steam flow of the heat source on the upper section of the $CO_2$ rich liquid reboiling pre-desorption device according to a heat-exchange reboiling mechanism between different heat sources (steam and ship exhaust) in the $CO_2$ rich liquid reboiling pre-desorption device and outlet rich liquid of the $CO_2$ rich liquid reboiling pre-desorption device and experiential operation knowledge, establishing a steam flow model for the heat source on the upper section of the $CO_2$ rich liquid reboiling pre-desorption device, modifying the steam flow model for the heat source on the upper section of the $CO_2$ rich liquid reboiling pre-desorption device in conjunction with steam parameters of the heat source on the upper section of the $CO_2$ rich liquid reboiling pre-desorption device, ship exhaust parameters of the heat source on the lower section of the $CO_2$ rich liquid reboiling pre-desorption device and historical data of the steam flow the heat source on the upper section of the $CO_2$ rich liquid reboiling pre-desorption device, and establishing the steam extraction flow accurate-prediction model for the heat source on the upper section of the $CO_2$ rich liquid reboiling pre-desorption device.

Preferably, the knowledge and data-driven exhaust extraction flow accurate-prediction model for the heat source of the $CO_2$ rich liquid preheating device established in S2 is expressed as:

$$Q_{y1} = f_2(T_1, a, b, T_{y1}) \qquad (1)$$

where, $Q_{y1}$ is the exhaust flow of the heat source of the $CO_2$ rich liquid preheating device, $T_1$ is the outlet rich liquid temperature of the $CO_2$ lean-rich liquid heat exchanger, $T_{y1}$ is the exhaust temperature of the heat source of the $CO_2$ rich liquid preheating device, a is the outlet rich liquid $CO_2$ load of the $CO_2$ lean-rich liquid heat exchanger, and b is the lean-rich liquid split fraction.

Preferably, the steam extraction flow accurate-prediction model for the heat source on the upper section of the $CO_2$ rich liquid reboiling pre-desorption device established in S3 is expressed as:

$$Q_{y2} = f_2(T_2, Q_C, Q_r, T_r, A_r, T_z, QX, T_x, QS) \qquad (2);$$

where, $Q_{y2}$ is the steam extraction flow of the heat source on the upper section of the $CO_2$ rich liquid reboiling pre-desorption device, $T_2$ is the outlet rich liquid temperature of the $CO_2$ rich liquid reboiling pre-desorption device, $Q_C$ is the outlet rich liquid flow of the $CO_2$ rich liquid preheating device, $Q_C$ is the inlet rich liquid flow of the $CO_2$ rich liquid reboiling pre-desorption device, $T_r$ is the inlet rich liquid temperature of the $CO_2$ rich liquid reboiling pre-desorption device, $A_r$ is the inlet rich liquid $CO_2$ load of the $CO_2$ rich liquid reboiling pre-desorption device, $T_z$ is the steam temperature of the heat source on the upper section of the $CO_2$ rich liquid reboiling pre-desorption device, Qx is the ship exhaust flow of the heat source on the lower section of the $CO_2$ rich liquid reboiling pre-desorption device, $T_x$ is the ship exhaust temperature of the heat source on the lower section of the $CO_2$ rich liquid reboiling pre-desorption device, and Qs is the steam flow of the heat source on the upper section of the $CO_2$ rich liquid reboiling pre-desorption device.

To sum up, the disclosure has the following technical effects and advantages:

1. To solve the problem of limited installation space for ship carbon capture equipment and high regenerative heat consumption during the desorption process, the disclosure provides a $CO_2$ desorption system suitable for limited space in a complex sailing region and a flexible control method, which realize stable operation of a carbon capture system in a complex sailing environment and further reduce desorption energy consumption by multiple approaches such as utilization of waste heat of ship exhaust, lean-rich liquid heat-exchange, rich liquid splitting, $CO_2$ rich liquid reboiling pre-desorption, as well as by the flexible control method for operating parameters of the $CO_2$ desorption system suitable for a complex sailing region; and compared with conventional carbon capture desorption systems, the $CO_2$ desorption system provided by disclosure can comprehensively reduce the desorption energy consumption by over 30% and make the desorption energy consumption as low as 2.0 GJ/t $CO_2$.

2. The compact $CO_2$ rich liquid preheating device provided by the disclosure adopts the two-phase closed heat-exchange tubes, only the detachable heat-exchange tubes are in direct contact with high-temperature ship exhaust, and the partition and Z-shaped bushings are used to realize dual physical isolation, such that the problem that safe operation is affected by cooling water leaking and dust blockage of heat-exchange tubes of traditional heat-exchange devices is solved, the compact $CO_2$ rich liquid preheating device is leak-proof and free of maintenance, thus greatly reducing the later maintenance cost; moreover, rich liquid circulates in the Z-shaped bushings where the two-phase closed heat-exchange tubes are inserted, such that the arrangement space is reduced, and a compact design of the $CO_2$ rich liquid preheating device is realized; $CO_2$ desorption of $CO_2$ rich liquid is partially completed in the $CO_2$ rich liquid reboiling pre-desorption device, and the desorption rate can be increased by controlling the temperature of the rich liquid entering the desorber, such that the height and space occupied by the $CO_2$ desorber are further reduced without affecting the $CO_2$ regeneration rate; in addition, by selecting the compact absorber, the compact desorber, the structural parameter of packing and an absorbent, the $CO_2$ capture efficiency reaches 90% or over, the volume of packing in the absorber and the desorber can be reduced by 30% or more, thus overcoming the difficulty in equipment arrangement of a desorption system in limited space.

3. The compact $CO_2$ rich liquid reboiling pre-desorption device provided by the disclosure adopts a plug-in liquid distributor, an rich liquid inlet has a certain initial velocity, and the quantity of steam used by a reboiler can be adjusted according to the quantity of inlet rich liquid, such that the problem of an excessively high vaporization rate caused by too much steam is solved to the maximum extent, thus avoiding scaling caused by excessive concentration of rich liquid in $CO_2$ rich liquid reboiling pre-desorption pipes; the $CO_2$ rich liquid reboiling pre-desorption device adopts heat sources of different qualities, the upper section of the $CO_2$ rich liquid reboiling pre-desorption device uses steam from the exhaust boiler as a sufficient and stable heat source to increase the temperature of the rich liquid stably, and the lower section of the $CO_2$ rich liquid reboiling pre-desorption device uses high-temperature ship exhaust as a heat source for gas-liquid separation and regeneration of the rich liquid, such that steam consumption of the upper section is reduced; the upper section and the lower section of the $CO_2$ rich liquid reboiling pre-desorption device are isolated by the partition, such that the steam will not be polluted and can be cycled; the outer walls of the $CO_2$ rich liquid reboiling pre-desorption tubes are configured as streamlined spiral unthreaded pipes, and the inner walls of the $CO_2$ rich liquid reboiling pre-desorption tubes are configured as smooth straight pipes, such that the contact area between steam and the falling-film pipes is enlarged to increase the heat-exchange coefficient, and under the same inlet condition, the heat-exchange area of the $CO_2$ rich liquid reboiling pre-desorption device is reduced by 20% or more, as compared with a kettle type heat exchanger and a thermosyphon heat exchanger.

DESCRIPTION OF THE DRAWINGS

To more clearly describe the technical solutions in the embodiments of the application or in the prior art, drawings used for describing the embodiments of the application or the prior art are briefly described below. Obviously, the drawings in the following description merely illustrate some embodiments of the application, and those skilled in the art can obtain other drawings according to the following ones without creative labor.

In the FIGS.: 1, engine; 2, exhaust boiler; 3, ship exhaust scrubber; 4, compact $CO_2$ absorber; 5, compact lean-rich liquid heat exchanger; 6, compact $CO_2$ desorber; 7-1, delivery pump a; 7-2, delivery pump b; 8, compact t $CO_2$ rich liquid preheating device; 9, compact $CO_2$ rich liquid reboiling pre-desorption device; 10, intelligent control platform; 11-1, electric control valve a; 11-2, electric control valve b; 11-3, electric control valve c; 61, demister; 62, $CO_2$ split rich liquid distributor; 63, rich liquid distributor after secondary heating; 64, packing layer; 65, riser; 66, $CO_2$ desorber bottom; 81, ship exhaust; 82, evaporation section; 83, condensation section; 84, two-phase closed heat-exchange tube; 85, partition; 86, heat-exchange medium; 87, Z-shaped bushing; 88, rich liquid; 91, rich liquid uniform-distribution section; 91a, plug-in liquid distributor; 92, heat-exchange section; 92a, shell; 92a1, upper end; 92a2, lower end; 92b, falling-fill pipe; 93, pre-desorption section; 93a, gas outlet; 93b, liquid outlet.

DETAILED DESCRIPTION OF PREFERRED EMBODIMENTS

The technical solutions in the embodiments of the disclosure will be clearly and completely described below in conjunction with the accompanying drawings of the embodiments. Obviously, the embodiments in the following description are merely illustrative ones and are not all possible ones of the disclosure. All other embodiments obtained by those ordinarily skilled in the art based on the following ones without creative labor should also fall within the protection scope of the disclosure.

Embodiment 1

Figure 1:
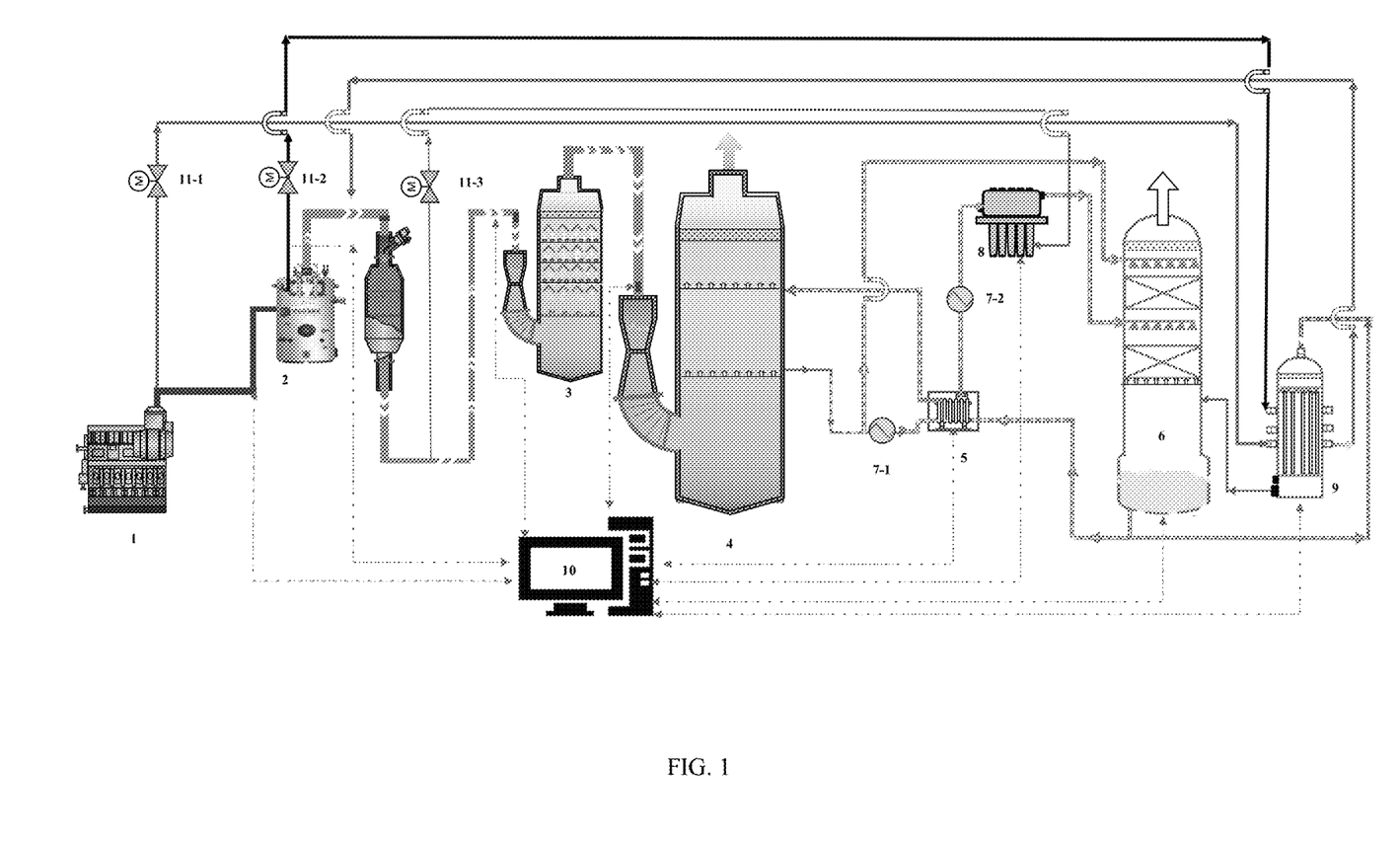
FIG. 1 is a flow diagram of a $CO_2$ desorption system suitable for limited space in a complex sailing region according to the disclosure.

Referring to FIG. 1, for ship exhaust 81 with a volume of 20000 Nm³/h, a $CO_2$ volume concentration of 5% and a temperature of 40° C., the $CO_2$ desorption system suitable for limited space in a complex sailing region comprises an exhaust boiler 2, a compact $CO_2$ absorber 4, a compact $CO_2$ lean-rich liquid heat exchanger 5, a compact $CO_2$ desorber 6, a compact $CO_2$ rich liquid preheating device 8, a compact $CO_2$ rich liquid reboiling pre-desorption device 9 and an intelligent control platform 10.

Figure 2:
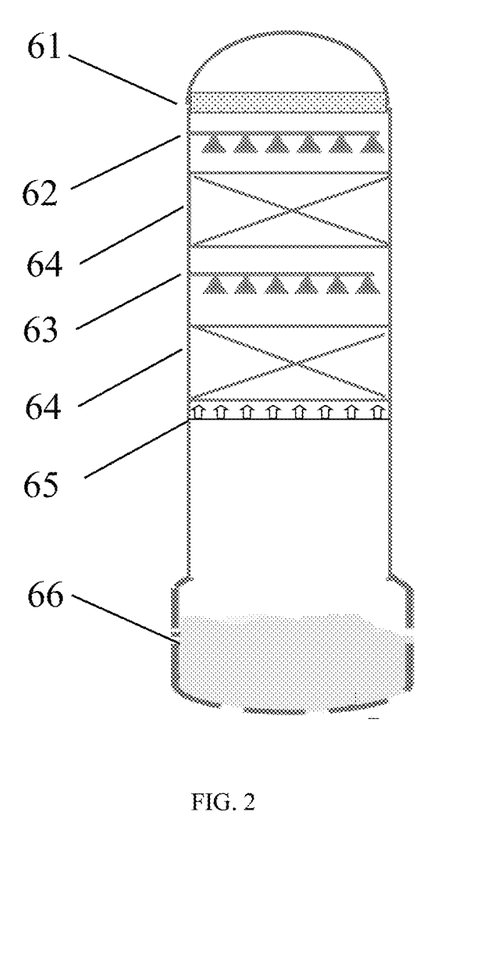
FIG. 2 is a structural diagram of a compact $CO_2$ desorber according to the disclosure.

Referring to FIG. 2, the compact $CO_2$ desorber 6 comprises a demister 61, a $CO_2$ split rich liquid distributor 62, a packing layer 64, a rich liquid distributor 63 after secondary heating, a packing layer 64, a riser 65 and a desorber bottom 66 which are sequentially arranged from top to bottom; the $CO_2$ rich liquid reboiling pre-desorption device 9 is connected to the desorber bottom 66; and the superficial gas velocity of the $CO_2$ desorber 6 is preferably 0.6 m/s, packing is preferably MELLAPAK, the structural parameter of the packing is preferably 250Y, the number of the packing layers is preferably 2, and the height of the packing layers 64 is preferably 5 m.

Figure 3:
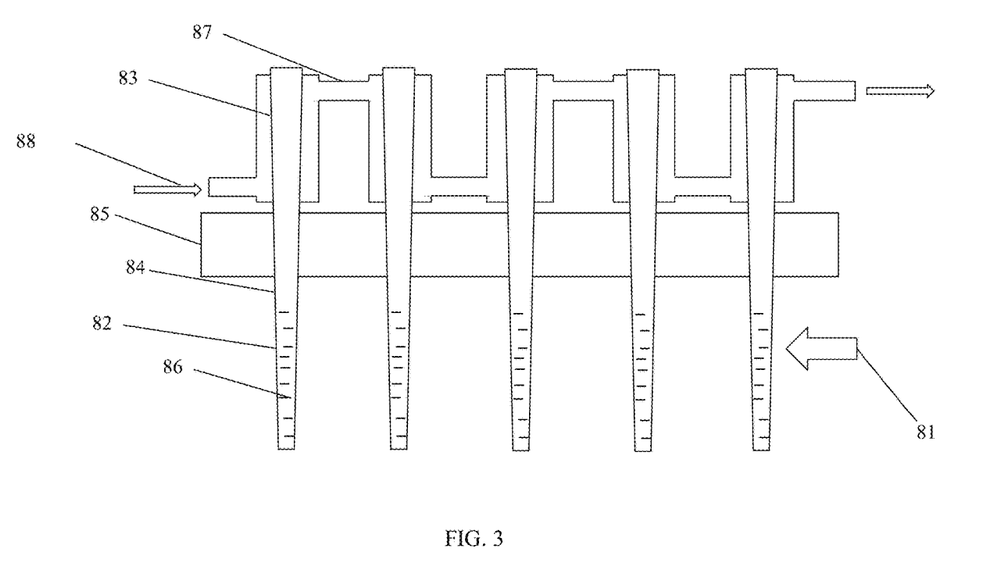
FIG. 3 is a structural diagram of a compact $CO_2$ rich liquid preheating device according to the disclosure.

Referring to FIG. 3, a heat source of the $CO_2$ rich liquid preheating device 8 is the ship exhaust 81 in front of a scrubber, and the gas temperature and flow of the heat source are controlled by an electric control valve c 11-3; the $CO_2$ rich liquid preheating device 8 comprises an evaporation section 82 and a condensation section 83, two-phase closed heat-exchange tubes 84 are arranged in the $CO_2$ rich liquid preheating device 8, upper portions of the two-phase closed heat-exchange tubes are sleeved with Z-shaped bushings 87, the evaporation section 82 and the condensation section 83 of the $CO_2$ rich liquid preheating device 8 are isolated by a partition 85 and located on the upper portions and lower portions of the two-phase closed heat-exchange tubes 84 respectively, a heat-exchange medium 86 in the lower portions of the two-phase closed heat-exchange tubes 84 is heated by the high-temperature ship exhaust 81, the heat-exchange medium 86 is preferably 1-(methoxy) nonafluorobutane, the filling rate of the heat-exchange medium 86 is preferably 30%, the heat-exchange medium 86 is heated to be evaporated to the upper portions of the two-phase closed heat-exchange tubes 84 to further make full contact with rich liquid 88, that is heated by heat exchange for the first time, in the Z-shaped bushings 87 on the upper portions of the two-phase closed heat-exchange tubes 84 to realize a temperature rise of the rich liquid 88; and the two-phase closed heat-exchange tubes 84 are preferably configured as trapezoidal spiral structures, the lower portions of the two-phase closed heat-exchange tubes 84 preferably have a diameter of 20 mm, the upper portions of the two-phase closed heat-exchange tubes 84 preferably have a diameter of 25 mm, the condensation section 83 accounts for 1/3 of the bulk length of the two-phase closed heat-exchange tubes 84, and the installation angle of the two-phase closed heat-exchange tubes 84 is preferably 30°.

Figure 4:
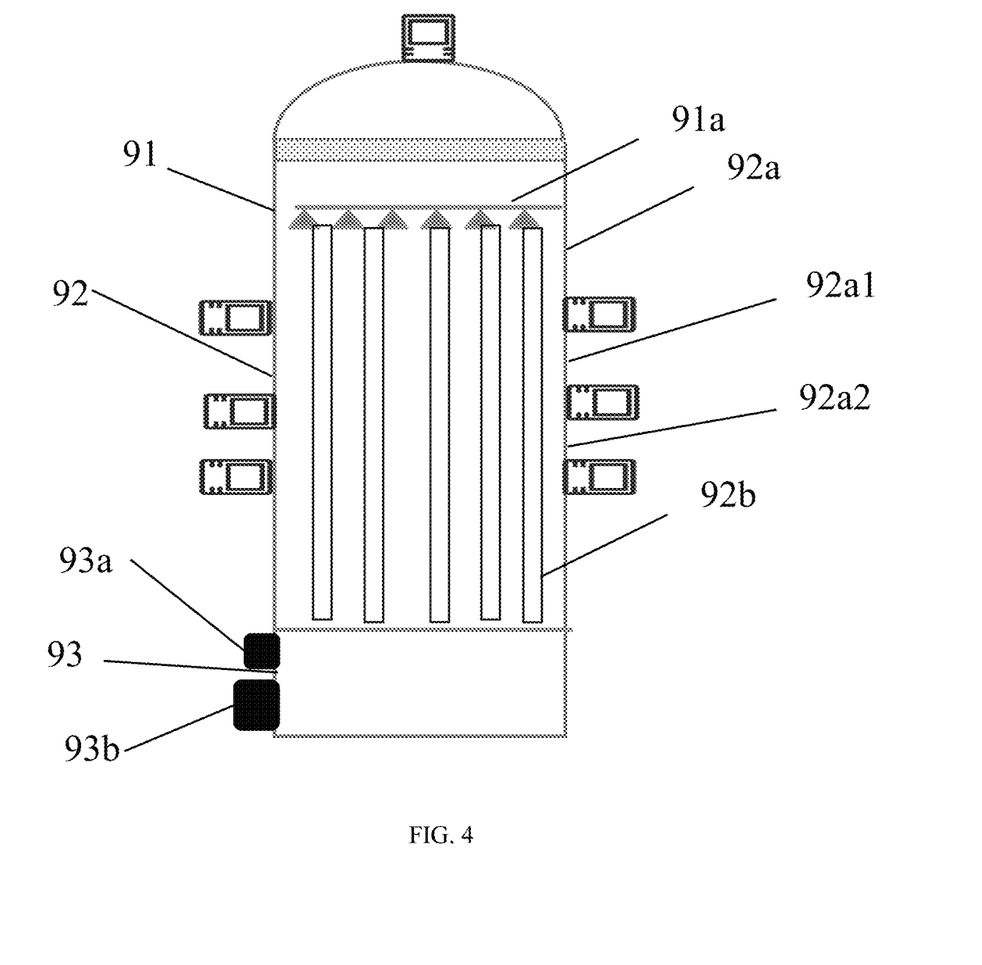
FIG. 4 is a structural diagram of a compact $CO_2$ rich liquid reboiling pre-desorption device according to the disclosure.

Referring to FIG. 4, a heat source of the $CO_2$ rich liquid reboiling pre-desorption device 9 is high-temperature exhaust from an outlet of a ship engine 1, and the gas temperature and flow of the heat source are controlled by an electric control valve a 11-1; the $CO_2$ rich liquid reboiling pre-desorption device 9 comprises a rich liquid uniform-distribution section 91, a heat-exchange section 92 and a pre-desorption section 93; a liquid distributor is arranged in the rich liquid uniform-distribution section 91, and to lower the structural probability, the liquid distributor is preferably a plug-in liquid distributor 91a; the heat-exchange section 92 is a main part of the $CO_2$ rich liquid reboiling pre-desorption device 9, and a shell 92a of the heat-exchange section 92 is cylindrical; further preferably, the shell 92a of the heat-exchange section 92 has an upper end 92a1 and a lower end 92a2, the upper end 92a1 uses steam from the exhaust boiler 2 as a heat source, the temperature of the steam is preferably 135-155° C., the lower end 92a2 uses high-temperature exhaust from the outlet of the ship engine 1 as a heat source, the flow of the exhaust can be intelligently controlled according to the condition of the sailing region, falling-film pipes 92b are vertically arranged in the heat-exchange section 92, outer walls of the falling-film pipes 92b are configured as streamlined spiral unthreaded pipes, inner walls of the falling-film pipes 92b are configured as smooth straight pipes, the falling-film pipes 92b preferably have a length of 3000 mm, a diameter of 32 mm and a wall thickness of 2 mm, and a center distance between the falling-film pipes 92b is 40 mm; and the pre-desorption section 93 is a detachable pipe provided with a flat cover, and the pipe has a gas outlet 93a located in an upper end of the pipe and a liquid outlet 93b located in a lower end of the pipe and is able to realize gas-liquid separation of secondary steam and hot lean liquid.

Monitoring control devices are arranged at an inlet in a front end of the heat-change section 92, a steam inlet and an exhaust inlet of the $CO_2$ rich liquid reboiling pre-desorption device 9 to monitor in real time the temperature and flow of rich liquid, the temperature and flow of steam, the temperature and flow of exhaust, and other parameters.

Ship exhaust 81 passes through the exhaust boiler 2 to realize waste heat utilization and then enters a ship exhaust scrubber 3 to be purified; the purified ship exhaust 81 further enters the compact $CO_2$ absorber 4, $CO_2$ in the ship exhaust is captured with a composite amine/mixed salt absorbent, the absorbent then turns into $CO_2$ rich liquid, and 10%-20% of the $CO_2$ rich liquid is split out to directly flow to the top of the $CO_2$ desorber 6; remaining non-split $CO_2$ rich liquid is delivered by a rich liquid delivery pump a 7-1 into the $CO_2$ lean-rich liquid heat exchanger 5 to be heated by heat exchange for the first time; after being heated by heat exchange for the first time, the rich liquid 88 is delivered by a rich liquid delivery pump b 7-2 into the Z-shaped bushings 87 of the $CO_2$ rich liquid preheating device 8 and then comes in contact with the evaporation section of the $CO_2$ rich liquid preheating device 8 to be heated by heat exchange for the second time, and then the rich liquid 88 enters an upper portion of the $CO_2$ desorber 6; the split rich liquid that is not heated sequentially passes through the split rich liquid distributor 62 and the rich liquid distributor 63 after secondary heating, the non-split rich liquid that is heated passes through the rich liquid distributor 63 after secondary heating and then passes through the packing layers 64 to reach the $CO_2$ desorber bottom 66 and then circulates to the $CO_2$ rich liquid reboiling pre-desorption device 9 to be heated by heat exchange for the third time to reach a rich liquid adsorption temperature; semi-rich liquid 88 obtained after the third time of heating is subjected to liquid water vaporization and releases a proportion of $CO_2$ gas, vaporized substances penetrate through the packing layers 64 by means of a riser in the $CO_2$ desorber 6 to realize desorption of high-temperature $CO_2$, the high-temperature $CO_2$ enters the upper portion of the $CO_2$ desorber 6 to reversely come in contact with the rich liquid 88 that is heated for the second time for further desorption, and the semi-rich liquid 88 that is not vaporized after being heated by heat exchange for the third time and the rich liquid 88 obtained after desorption turn into lean liquid.

In the face of above condition, the heat-exchange area of the $CO_2$ rich liquid reboiling pre-desorption device provided by the disclosure is only 175 $m^2$, the heat-exchange area of a traditional hydrocone reboiler is over 220 $m^2$, and because the $CO_2$ rich liquid reboiling pre-desorption device has a pre-desorption function, the size of the $CO_2$ desorber can be reduced by 20%.

Embodiment 2

The flexible control method for a $CO_2$ desorption system suitable for limited space in a complex sailing region comprises: establishing a knowledge and data-driven exhaust extraction flow accurate-prediction model for a heat source of a $CO_2$ rich liquid preheating device and a steam extraction flow accurate-prediction model for a heat source on an upper section of a $CO_2$ rich liquid reboiling pre-desorption device, establishing a global optimization control method for a $CO_2$ desorption system suitable for limited space in a complex sailing region, and performing operation optimization with an outlet rich liquid temperature of the $CO_2$ rich liquid reboiling pre-desorption device and energy consumption of the desorption system as constraint indicators; when a ship sails to different regions or an operating condition of the ship fluctuates, implementing accurate prediction of an exhaust extraction flow of the heat source of the $CO_2$ rich liquid preheating device under different operating conditions by means of the knowledge and data-driven exhaust extraction flow accurate-prediction model for the heat source of the $CO_2$ rich liquid preheating device; and, implementing accurate prediction of a steam extraction flow of the heat source of the upper portion of the $CO_2$ rich liquid reboiling pre-desorption device under different operating conditions by means of the steam extraction flow accurate-prediction model for the heat source on the upper section of the $CO_2$ rich liquid reboiling pre-desorption device in conjunction with operating parameters of the desorption system and quality parameters of extracted steam, so as to minimize the steam extraction flow of the heat source on the upper section of the $CO_2$ rich liquid reboiling pre-desorption device under the precondition that the outlet rich liquid temperature of the $CO_2$ rich liquid reboiling pre-desorption device satisfy requirements of the desorption system, thus minimizing energy consumption of the desorption system.

Establishing a knowledge and data-driven exhaust extraction flow accurate-prediction model for a heat source of a $CO_2$ rich liquid preheating device and a steam extraction flow accurate-prediction model for a heat source on an upper section of a $CO_2$ rich liquid reboiling pre-desorption device comprises the following steps:

- S1, based on online and historical operation data, establishing a parameter database including physical property parameters of an absorbent, design parameters of a $CO_2$ lean-rich liquid heat exchanger, the $CO_2$ rich liquid preheating device and the $CO_2$ rich liquid reboiling pre-desorption device, inlet and outlet rich liquid temperatures and flows of the $CO_2$ lean-rich liquid heat exchanger, inlet and outlet rich liquid temperatures and flows of the $CO_2$ rich liquid preheating device, inlet and outlet rich liquid temperatures and flows of the $CO_2$ rich liquid reboiling pre-desorption device, inlet and outlet steam temperatures and flows of the $CO_2$ rich liquid reboiling pre-desorption device, inlet and outlet exhaust temperatures and flows of the $CO_2$ rich liquid preheating device, and inlet and outlet exhaust temperatures and flows of the $CO_2$ rich liquid reboiling pre-desorption device;
- S2, based on the parameter database established in S1, for the $CO_2$ rich liquid preheating device, analyzing response relations of the inlet rich liquid temperature of the $CO_2$ rich liquid preheating device (the outlet rich liquid temperature of the $CO_2$ lean-rich liquid heat exchanger), an inlet rich liquid $CO_2$ load of the $CO_2$ rich liquid preheating device (an outlet rich liquid $CO_2$ load of the $CO_2$ lean-rich liquid heat exchanger), a lean-rich liquid split fraction, the outlet rich liquid temperature of the $CO_2$ rich liquid preheating device and an exhaust temperature of the heat source of the $CO_2$ rich liquid preheating device with an exhaust flow of the heat source of the $CO_2$ rich liquid preheating device according to a heat-exchange mechanism between different heat sources in the $CO_2$ rich liquid preheating device and outlet rich liquid of the $CO_2$ lean-rich liquid heat exchanger and experiential operation knowledge, establishing an exhaust extraction flow model for the heat source of the $CO_2$ rich liquid preheating device in different sailing regions and operating conditions, modifying the exhaust extraction flow model for the heat source of the $CO_2$ rich liquid preheating device in conjunction with quality parameters of the heat source and historical data of the outlet rich liquid temperature of the $CO_2$ rich liquid preheating device, and establishing the knowledge and data-driven exhaust extraction flow accurate-prediction model for the heat source of the $CO_2$ rich liquid preheating device;

wherein, preferably, the knowledge and data-driven exhaust extraction flow accurate-prediction model for the heat source of the $CO_2$ rich liquid preheating device established in S2 is expressed as:

$$Q_{y1} = f_2(T_1, a, b, T_{y1}) \qquad (1);$$

where $Q_{y1}$ is the exhaust flow of the heat source of the $CO_2$ rich liquid preheating device, $T_1$ is the outlet rich liquid temperature of the $CO_2$ lean-rich liquid heat exchanger, $T_{y1}$ is the exhaust temperature of the heat source of the $CO_2$ rich liquid preheating device, a is the outlet rich liquid $CO_2$ load of the $CO_2$ lean-rich liquid heat exchanger, and b is the lean-rich liquid split fraction; and S3, based on the parameter database established in S1, for the $CO_2$ rich liquid reboiling pre-desorption device, analyzing response relations of the outlet rich liquid temperature of the $CO_2$ rich liquid reboiling pre-desorption device, the outlet rich liquid flow of the $CO_2$ rich liquid preheating device, the inlet rich liquid flow of the $CO_2$ rich liquid reboiling pre-desorption device, the inlet rich liquid temperature of the $CO_2$ rich liquid reboiling pre-desorption device, the inlet rich liquid $CO_2$ load of the $CO_2$ rich liquid reboiling pre-desorption device, a steam temperature of the heat source on the upper section of the $CO_2$ rich liquid reboiling pre-desorption device, and a ship exhaust flow and temperature of a heat source on a lower section of the $CO_2$ rich liquid reboiling pre-desorption device with a steam flow of the heat source on the upper section of the $CO_2$ rich liquid reboiling pre-desorption device according to a heat-exchange reboiling mechanism between different heat sources (steam and ship exhaust) in the $CO_2$ rich liquid reboiling pre-desorption device and outlet rich liquid of the $CO_2$ rich liquid reboiling pre-desorption device and experiential operation knowledge, establishing a steam flow model for the heat source on the upper section of the $CO_2$ rich liquid reboiling pre-desorption device, modifying the steam flow model for the heat source on the upper section of the $CO_2$ rich liquid reboiling pre-desorption device in conjunction with steam parameters of the heat source on the upper section of the $CO_2$ rich liquid reboiling pre-desorption device, ship exhaust parameters of the heat source on the lower section of the $CO_2$ rich liquid reboiling pre-desorption device and historical data of the steam flow the heat source on the upper section of the $CO_2$ rich liquid reboiling pre-desorption device, and establishing the steam extraction flow accurate-prediction model for the heat source on the upper section of the $CO_2$ rich liquid reboiling pre-desorption device;

wherein, preferably, the steam extraction flow accurate-prediction model for the heat source on the upper section of the $CO_2$ rich liquid reboiling pre-desorption device established in S3 is expressed as:

$$Q_{y2}=f_2(T_2,Q_C,Q_r,T_r,A_r,T_z,Qx,T_x,Qs) \quad (2);$$

where, $Q_{y2}$ is the steam extraction flow of the heat source on the upper section of the $CO_2$ rich liquid reboiling pre-desorption device, $T_2$ is the outlet rich liquid temperature of the $CO_2$ rich liquid reboiling pre-desorption device, $Q_C$ is the outlet rich liquid flow of the $CO_2$ rich liquid preheating device, $Q_r$ is the inlet rich liquid flow of the $CO_2$ rich liquid reboiling pre-desorption device, $T_r$ is the inlet rich liquid temperature of the $CO_2$ rich liquid reboiling pre-desorption device, $A_r$ is the inlet rich liquid $CO_2$ load of the $CO_2$ rich liquid reboiling pre-desorption device, $T_z$ is the steam temperature of the heat source on the upper section of the $CO_2$ rich liquid reboiling pre-desorption device, Qx is the ship exhaust flow of the heat source on the lower section of the $CO_2$ rich liquid reboiling pre-desorption device, $T_x$ is the ship exhaust temperature of the heat source on the lower section of the $CO_2$ rich liquid reboiling pre-desorption device, and Qs is the steam flow of the heat source on the upper section of the $CO_2$ rich liquid reboiling pre-desorption device.

Figure 5:
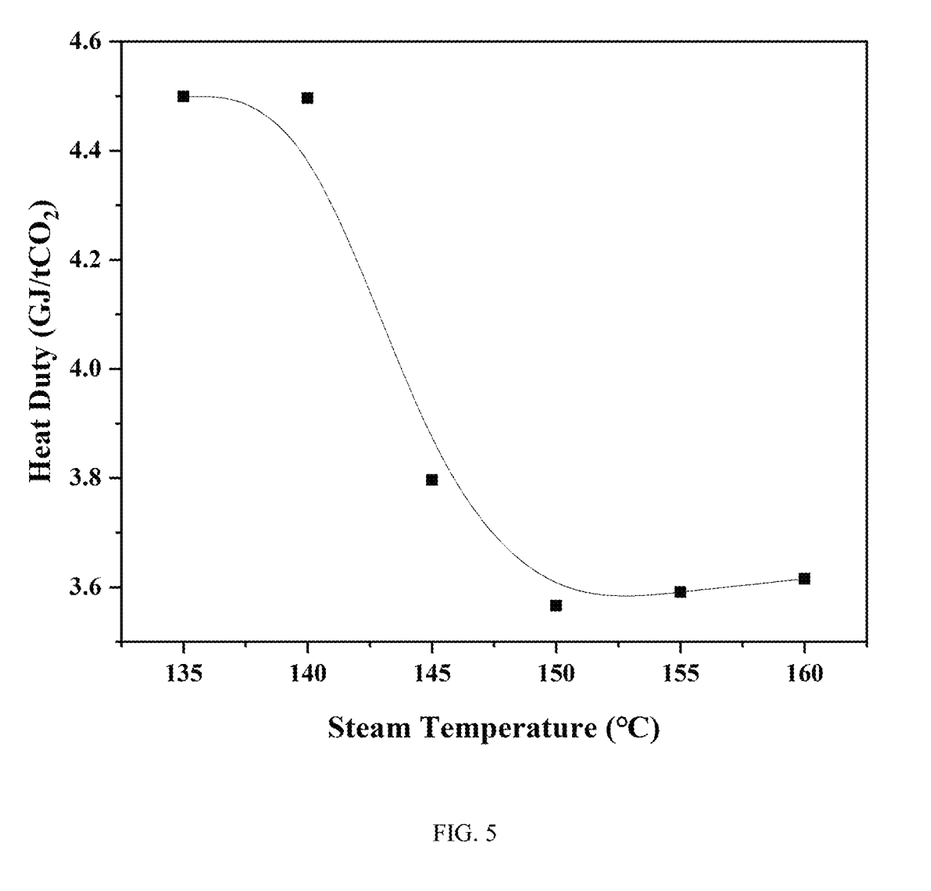
FIG. 5 is a diagram of the relation between steam temperature and desorption energy consumption according to the disclosure.

The rich liquid flow, the inlet rich liquid temperature and the steam temperature are optimized. Referring to FIG. 5, when the steam temperature is 135° C., the desorption energy consumption may be as high as 4.50 GJ/t $CO_2$; and when the steam temperature is 150° C., the desorption energy consumption may be as low as 3.57 GJ/t $CO_2$. Therefore, the steam temperature is set to be 150° C. in this embodiment, and as compared with the case where the steam temperature is set to be 150° C., the energy consumption can be reduced by 20.7%.

Figure 6:
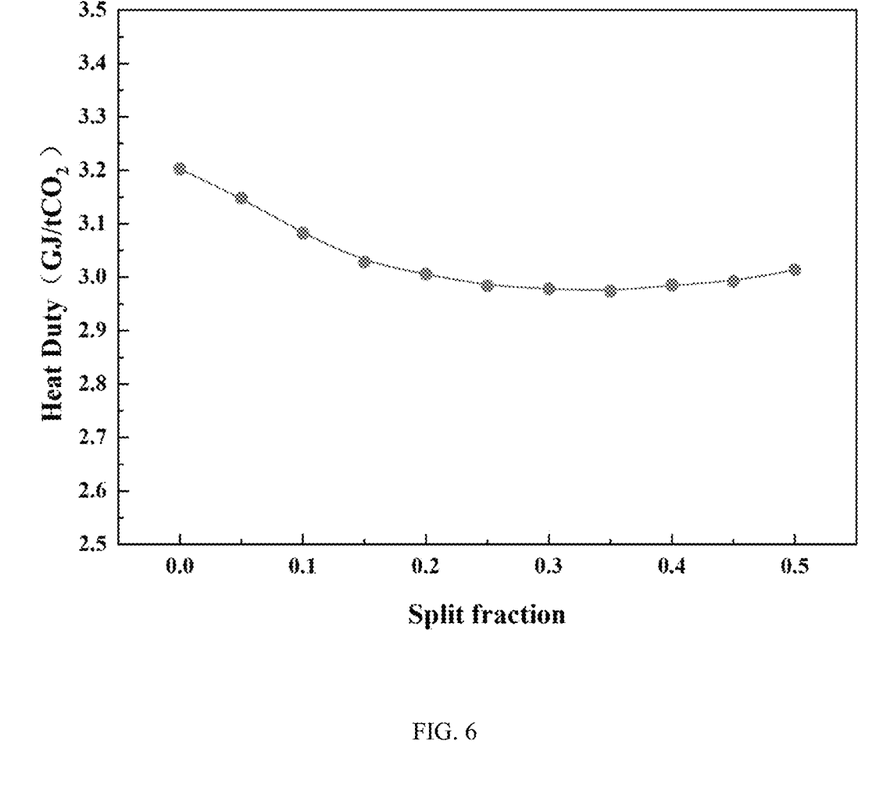
FIG. 6 is a diagram of the relation between the split fraction of rich liquid and desorption energy consumption according to the disclosure.

Referring to FIG. 6, with the increase of the split fraction of the rich liquid, the $CO_2$ regeneration heat duty decreases first and then increases; when the split fraction of the rich liquid is 35%, the $CO_2$ regeneration heat duty is minimum. However, considering that the waste heat of outlet gas of the $CO_2$ desorber is used to the maximum extent when the split fraction reaches 25% and a further increase in the split fraction of the rich liquid will lead to an increase in the flow of the delivery pumps, which in turn will increase power consumption of the system, the split fraction of the rich liquid is set to be 25% in this embodiment to keep balance between the $CO_2$ regeneration heat duty and power consumption of a rich liquid split flow pump, and in this case, the $CO_2$ regeneration heat duty is 2.98 GJ/t$CO_2$; and compared with a case where the rich liquid split process is not adopted, the $CO_2$ regeneration heat duty is reduced by 6.9%.

Figure 7:
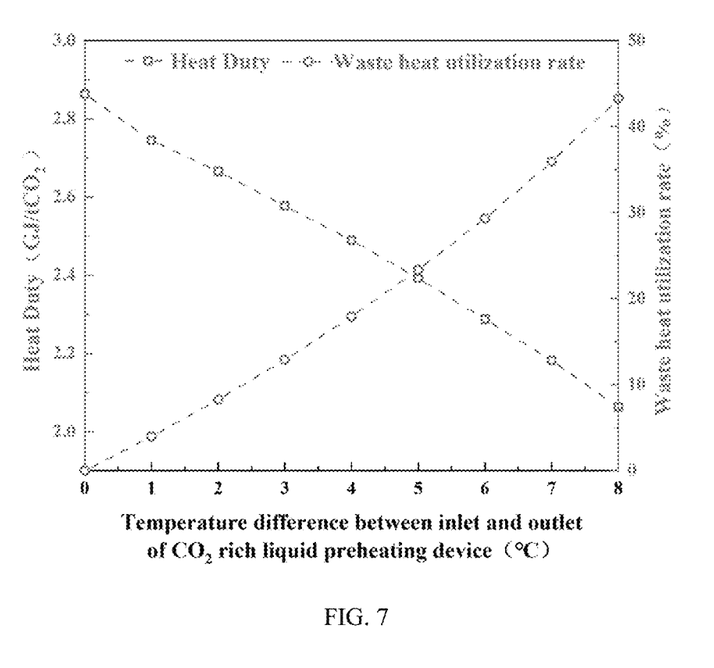
FIG. 7 is a diagram of the relation between the temperature difference between an inlet and an outlet of the $CO_2$ rich liquid preheating device and desorption energy consumption according to the disclosure.

Referring to FIG. 7, under the condition where the split fraction of rich liquid is 25%, 240° C. high-temperature exhaust is extracted from the outlet of the ship engine to be used as a heat source by means of the knowledge and data-driven exhaust extraction flow accurate-prediction model for the heat source of the $CO_2$ rich liquid preheating device; when the inlet rich liquid temperature of the $CO_2$ rich liquid reboiling pre-desorption device is increased by 8° C., the desorption energy consumption may be as low as 2.07 GJ/t $CO_2$, and compared with a case where the high-temperature exhaust of the ship engine is not extracted, the desorption energy consumption is reduced by 25.6%.

Further, operation optimization is performed with the outlet rich liquid temperature of the $CO_2$ rich liquid reboiling pre-desorption device and energy consumption of the desorption system as constraint indicators; when a ship sails to different regions or an operating condition of the ship fluctuates, accurate prediction of the exhaust extraction flow of the heat source of the $CO_2$ rich liquid preheating device under different operating conditions is implemented by means of the knowledge and data-driven exhaust extraction flow accurate-prediction model for the heat source of the $CO_2$ rich liquid preheating device; and accurate prediction of the steam extraction flow of the heat source of the upper portion of the $CO_2$ rich liquid reboiling pre-desorption device under different operating conditions is implemented by means of the steam extraction flow accurate-prediction model for the heat source on the upper section of the $CO_2$ rich liquid reboiling pre-desorption device in conjunction with operating parameters of the desorption system and quality parameters of extracted steam, so as to minimize the steam extraction flow of the heat source on the upper section of the $CO_2$ rich liquid reboiling pre-desorption device under the precondition that the outlet rich liquid temperature of the $CO_2$ rich liquid reboiling pre-desorption device satisfy requirements of the desorption system. In this way, the ship exhaust is used to the maximum extent to replace part of the steam heat source, thus reducing the desorption energy consumption to be 2.0GJ/t $CO_2$ or lower.

Comparative Example

For ship exhaust with a volume of 20000 Nm³/h, a $CO_2$ volume concentration of 5% and a temperature of 40° C., packing in the desorber of the $CO_2$ desorption system in Embodiment 1 is IMTP, the number of the packing layers is two, the total height of the packing layers is 10 m, an overall pressure drop of the desorber is as high as 6400 Pa, and rich liquid splitting, utilization of waste heat of ship exhaust, $CO_2$ rich liquid reboiling desorption and the flexible control method for the $CO_2$ desorption system suitable for a complex sailing region are not adopted, so the desorption energy consumption of a whole carbon capture system is as high as 4.0 GJ/t $CO_2$.

Finally, it should be noted that the above embodiments are merely preferred ones of the disclosure and are not intended to limit the disclosure. Although the disclosure has been described in detail with reference to the above embodiments, those skilled in the art can still make amendments to the technical solutions in the above embodiments or make equivalent substitutions to part of the technical features in the embodiments, and any amendments, equivalent substitutions and improvements made based on the spirit and principle of the disclosure should also fall within the protection scope of the claims.

What is claimed is:

1. A $CO_2$ desorption system suitable for limited space in a complex sailing region, comprising an exhaust boiler, a compact $CO_2$ absorber, a compact $CO_2$ lean-rich liquid heat exchanger, a compact $CO_2$ desorber, a compact $CO_2$ rich liquid preheating device, a compact $CO_2$ rich liquid reboiling pre-desorption device and an intelligent control platform, wherein ship exhaust passes through the exhaust boiler to realize waste heat utilization and then enters a ship exhaust scrubber to be purified; the purified ship exhaust further enters the compact $CO_2$ absorber, $CO_2$ in the ship exhaust is captured with a composite amine/mixed salt absorbent, the absorbent then turns into $CO_2$ rich liquid, and 10%-20% of the $CO_2$ rich liquid is split out to directly flow to a top of the compact CO₂ desorber; remaining non-split CO₂ rich liquid is delivered by a rich liquid delivery pump a into the CO₂ lean-rich liquid heat exchanger to be heated by heat exchange for the first time; after being heated by heat exchange for the first time, the rich liquid is delivered by a rich liquid delivery pump b into Z-shaped bushings of the CO₂ rich liquid preheating device and then comes in contact with an evaporation section of the CO₂ rich liquid preheating device to be heated by heat exchange for the second time, and then the rich liquid enters an upper portion of the CO₂ desorber; all the rich liquid flows through a liquid distributor and packing layers of the CO₂ desorber to reach a bottom of the CO₂ desorber and then circulates to the CO₂ rich liquid reboiling pre-desorption device to be heated by heat exchange for the third time to reach a rich liquid adsorption temperature; semi-rich liquid obtained after the third time of heating is subjected to liquid water vaporization and releases vaporized substances containing a proportion of CO₂, the vaporized substances penetrate through the packing layers by means of a riser in the CO₂ desorber to realize desorption of high-temperature CO₂, the high-temperature CO₂ enters the upper portion of the CO₂ desorber to reversely come in contact with the rich liquid that is heated for the second time to enhance further desorption of the rich liquid, and the semi-rich liquid that is not vaporized after being heated by heat exchange for the third time and the rich liquid obtained after desorption turn into lean liquid.

2. The CO₂ desorption system according to claim 1, wherein the compact CO₂ desorber comprises a demister, a CO₂ split rich liquid distributor, a packing layer, a rich liquid distributor after secondary heating, a packing layer, a riser and the bottom of the CO₂ desorber which are sequentially arranged from top to bottom, and the compact CO₂ rich liquid reboiling pre-desorption device is connected to the bottom of the CO₂ desorber; and a superficial gas velocity of the CO₂ desorber is 0.5-0.8 m/s, packing is one or more selected from MELLAPAK, FLEXIPAC and PALL, a structural parameter of the packing is one or more selected from 500Y, 500X, 250X and 250Y, the number of the packing layers is 2-3, and a total height of the packing layers is 4-8 m.

3. The CO₂ desorption system according to claim 1, wherein the CO₂ rich liquid preheating device comprises an evaporation section and a condensation section, two-phase closed heat-exchange tubes are arranged in the CO₂ rich liquid preheating device, upper portions of the two-phase closed heat-exchange tubes are sleeved with Z-shaped bushings, the evaporation section and the condensation section of the CO₂ rich liquid preheating device are isolated by a partition and located on the upper portions and lower portions of the two-phase closed heat-exchange tubes respectively, a heat-exchange medium in the lower portions of the two-phase closed heat-exchange tubes is heated by a high-temperature heat source, the medium is heated to be evaporated to the upper portions of the two-phase closed heat-exchange tubes to further make full contact with the rich liquid, that is heated by heat exchange for the first time, in the upper portions of the two-phase closed heat-exchange tubes to realize a temperature rise of the rich liquid; and a heat source of the CO₂ rich liquid preheating device is high-temperature exhaust from an outlet of a ship engine, ship exhaust with waste heat being used by the exhaust boiler, steam of the waste boiler, or ship exhaust in front of the scrubber.

4. The CO₂ desorption system according to claim 3, wherein the two-phase closed heat-exchange tubes are configured as trapezoidal spiral structures, the lower portions of the two-phase closed heat-exchange tubes have a diameter of 16-32 mm, the upper portions of the two-phase closed heat-exchange tubes have a diameter of 20-40 mm, the condensation section of the CO₂ rich liquid preheating device accounts for ⅓ of a bulk length of the two-phase closed heat-exchange tubes, an installation angle of the two-phase closed heat-exchange tube is 10°-30°, the heat-exchange medium in the two-phase closed heat-exchange tubes is 1-(methoxy) nonafluorobutane or perfluoropentane, and a filling rate of the medium in the two-phase closed heat-exchange tubes is 20%-40%.

5. The CO₂ desorption system according to claim 1, wherein the CO₂ rich liquid reboiling pre-desorption device comprises a rich liquid uniform-distribution section, a heat-exchange section and a pre-desorption section; a liquid distributor is arranged in the rich liquid uniform-distribution section, the heat-exchange section is a main part of the CO₂ rich liquid reboiling pre-desorption device, the pre-desorption section is a detachable pipe provided with a flat cover, and the pipe has a gas outlet located in an upper end of the pipe and a liquid outlet located in a lower end of the pipe and is able to realize gas-liquid separation of secondary steam and hot lean liquid; and a heat source of the CO₂ rich liquid reboiling pre-desorption device is high-temperature exhaust from an outlet of a ship engine, ship exhaust with waste heat being used by the exhaust boiler, steam of the waste boiler, or ship exhaust in front of the scrubber.

6. The CO₂ desorption system according to claim 5, wherein the liquid distributor arranged in the rich liquid uniform-distribution section is a plug-in liquid distributor or a sawtooth overflow distributor; a shell of the heat-exchange section of the CO₂ rich liquid reboiling pre-desorption device is cylindrical and has an upper end and a lower end, the upper end uses the steam of the exhaust boiler as a heat source, the temperature of the steam is 125-155° C., the lower end uses the high-temperature exhaust from the outlet of the ship engine, the ship exhaust with waste heat being used by the exhaust boiler, the steam of the waste boiler, or the ship exhaust in front of the scrubber as a heat source, and the flow of the exhaust is flexibly controlled by means of the intelligent control platform according to an actual condition; and falling-film pipes are vertically arranged in the heat-exchange section of the CO₂ rich liquid reboiling pre-desorption device, the falling-film pipes have a length of 3000 mm, 4000 mm or 6000 mm, a diameter of 28-32 mm and a wall thickness of 2-3 mm, and a center distance between the falling-film pipes is more than twice the diameter of the falling-film pipes.

7. A flexible control method for a CO₂ desorption system suitable for limited space in a complex sailing region, comprising: establishing a knowledge and data-driven exhaust extraction flow accurate-prediction model for a heat source of a CO₂ rich liquid preheating device and a steam extraction flow accurate-prediction model for a heat source on an upper section of a CO₂ rich liquid reboiling pre-desorption device, establishing a global optimization control method for a CO₂ desorption system suitable for limited space in a complex sailing region, and performing operation optimization with an outlet rich liquid temperature of the CO₂ rich liquid reboiling pre-desorption device and energy consumption of the desorption system as constraint indicators; when a ship sails to different regions or an operating condition of the ship fluctuates, implementing accurate prediction of an exhaust extraction flow of the heat source of the CO₂ rich liquid preheating device under different operating conditions by means of the knowledge and data-driven exhaust extraction flow accurate-prediction model for the heat source of the CO₂ rich liquid preheating device; and, implementing accurate prediction of a steam extraction flow of the heat source of the upper portion of the CO₂ rich liquid reboiling pre-desorption device under different operating conditions by means of the steam extraction flow accurate-prediction model for the heat source on the upper section of the CO₂ rich liquid reboiling pre-desorption device in conjunction with operating parameters of the desorption system and quality parameters of extracted steam, so as to minimize the steam extraction flow of the heat source on the upper section of the CO₂ rich liquid reboiling pre-desorption device under the precondition that the outlet rich liquid temperature of the CO₂ rich liquid reboiling pre-desorption device satisfy requirements of the desorption system, thus minimizing energy consumption of the desorption system.

8. The flexible control method according to claim 7, wherein establishing a knowledge and data-driven exhaust extraction flow accurate-prediction model for a heat source of a CO₂ rich liquid preheating device and a steam extraction flow accurate-prediction model for a heat source on an upper section of a CO₂ rich liquid reboiling pre-desorption device comprises the following steps:

S1, based on online and historical operation data, establishing a parameter database including physical property parameters of an absorbent, design parameters of a CO₂ lean-rich liquid heat exchanger, the CO₂ rich liquid preheating device and the CO₂ rich liquid reboiling pre-desorption device, inlet and outlet rich liquid temperatures and flows of the CO₂ lean-rich liquid heat exchanger, inlet and outlet rich liquid temperatures and flows of the CO₂ rich liquid preheating device, inlet and outlet rich liquid temperatures and flows of the CO₂ rich liquid reboiling pre-desorption device, inlet and outlet steam temperatures and flows of the CO₂ rich liquid reboiling pre-desorption device, inlet and outlet exhaust temperatures and flows of the CO₂ rich liquid preheating device, and inlet and outlet exhaust temperatures and flows of the CO₂ rich liquid reboiling pre-desorption device;

S2, based on the parameter database established in S1, for the CO₂ rich liquid preheating device, analyzing response relations of the inlet rich liquid temperature of the CO₂ rich liquid preheating device (the outlet rich liquid temperature of the CO₂ lean-rich liquid heat exchanger), an inlet rich liquid CO₂ load of the CO₂ rich liquid preheating device (an outlet rich liquid CO₂ load of the CO₂ lean-rich liquid heat exchanger), a lean-rich liquid split fraction, the outlet rich liquid temperature of the CO₂ rich liquid preheating device and an exhaust temperature of the heat source of the CO₂ rich liquid preheating device with an exhaust flow of the heat source of the CO₂ rich liquid preheating device according to a heat-exchange mechanism between different heat sources in the CO₂ rich liquid preheating device and outlet rich liquid of the CO₂ lean-rich liquid heat exchanger and experiential operation knowledge, establishing an exhaust extraction flow model for the heat source of the CO₂ rich liquid preheating device in different sailing regions and operating conditions, modifying the exhaust extraction flow model for the heat source of the CO₂ rich liquid preheating device in conjunction with quality parameters of the heat source and historical data of the outlet rich liquid temperature of the CO₂ rich liquid preheating device, and establishing the knowledge and data-driven exhaust extraction flow accurate-prediction model for the heat source of the CO₂ rich liquid preheating device;

wherein, the knowledge and data-driven exhaust t extraction flow accurate-prediction model for the heat source of the CO₂ rich liquid preheating device established in S2 is expressed as:

$$Q_{y1} = f_2(T_1, a, b, T_{y1}) \quad (1)$$

where, $Q_{y1}$ is the exhaust flow of the heat source of the CO₂ rich liquid preheating device, $T_1$ is the outlet rich liquid temperature of the CO₂ lean-rich liquid heat exchanger, $T_{y1}$ is the exhaust temperature of the heat source of the CO₂ rich liquid preheating device, a is the outlet rich liquid CO₂ load of the CO₂ lean-rich liquid heat exchanger, and b is the lean-rich liquid split fraction; and S3, based on the parameter database established in S1, for the CO₂ rich liquid reboiling pre-desorption device, analyzing response relations of the outlet rich liquid temperature of the CO₂ rich liquid reboiling pre-desorption device, the outlet rich liquid flow of the CO₂ rich liquid preheating device, the inlet rich liquid flow of the CO₂ rich liquid reboiling pre-desorption device, the inlet rich liquid temperature of the CO₂ rich liquid reboiling pre-desorption device, the inlet rich liquid CO₂ load of the CO₂ rich liquid reboiling pre-desorption device, a steam temperature of the heat source on the upper section of the CO₂ rich liquid reboiling pre-desorption device, and a ship exhaust flow and temperature of a heat source on a lower section of the CO₂ rich liquid reboiling pre-desorption device with a steam flow of the heat source on the upper section of the CO₂ rich liquid reboiling pre-desorption device according to a heat-exchange reboiling mechanism between different heat sources (steam and ship exhaust) in the CO₂ rich liquid reboiling pre-desorption device and outlet rich liquid of the CO₂ rich liquid reboiling pre-desorption device and experiential operation knowledge, establishing a steam flow model for the heat source on the upper section of the CO₂ rich liquid reboiling pre-desorption device, modifying the steam flow model for the heat source on the upper section of the CO₂ rich liquid reboiling pre-desorption device in conjunction with steam parameters of the heat source on the upper section of the CO₂ rich liquid reboiling pre-desorption device, ship exhaust parameters of the heat source on the lower section of the CO₂ rich liquid reboiling pre-desorption device and historical data of the steam flow the heat source on the upper section of the CO₂ rich liquid reboiling pre-desorption device, and establishing the steam extraction flow accurate-prediction model for the heat source on the upper section of the CO₂ rich liquid reboiling pre-desorption device;

wherein, the steam extraction flow accurate-prediction model for the heat source on the upper section of the CO₂ rich liquid reboiling pre-desorption device established in S3 is expressed as:

$$Q_{y2} = f_2(T_2, Q_C, Q_r, T_r, A_r, T_z, Qx, T_x, Qs) \quad (2)$$

where, $Q_{y2}$ is the steam extraction flow of the heat source on the upper section of the CO₂ rich liquid reboiling pre-desorption device, $T_2$ is the outlet rich liquid temperature of the CO₂ rich liquid reboiling pre-desorption device, $Q_C$ is the outlet rich liquid flow of the CO₂ rich liquid preheating device, $Q_r$ is the inlet rich liquid flow of the CO₂ rich liquid reboiling pre-desorption device, $T_r$ is the inlet rich liquid temperature of the $CO_2$ rich liquid reboiling pre-desorption device, $A_r$ is the inlet rich liquid $CO_2$ load of the $CO_2$ rich liquid reboiling pre-desorption device, $T_2$ is the steam temperature of the heat source on the upper section of the $CO_2$ rich liquid reboiling pre-desorption device, Qx is the ship exhaust flow of the heat source on the lower section of the $CO_2$ rich liquid reboiling pre-desorption device, $T_x$ is the ship exhaust temperature of the heat source on the lower section of the $CO_2$ rich liquid reboiling pre-desorption device, and Qs is the steam flow of the heat source on the upper section of the $CO_2$ rich liquid reboiling pre-desorption device.

\* \* \* \* \*